United States Patent
Kumar et al.

(10) Patent No.: US 9,783,312 B2
(45) Date of Patent: Oct. 10, 2017

(54) METHOD AND APPARATUS FOR REDUCING HIGH TRANSIENT MOUNT LOAD IN AIRCRAFT ENGINE MOUNTING SYSTEMS

(71) Applicant: HONEYWELL INTERNATIONAL INC., Morristown, NJ (US)

(72) Inventors: Avinash Kumar, Karnataka (IN); Theodore Brockett, Gilbert, AZ (US); Srinivas Chinthapally, Andhra Pradesh (IN); Krishna Mohan Kumbham, Karnataka (IN); Milind Khare, Karnataka (IN); Venkatarao Ganji, Karnataka (IN); Rama Sateesh Venkata Kandula, Andra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 364 days.

(21) Appl. No.: 14/327,627

(22) Filed: Jul. 10, 2014

(65) Prior Publication Data
US 2016/0009403 A1    Jan. 14, 2016

(51) Int. Cl.
*B64D 27/26*        (2006.01)
*F02C 7/20*         (2006.01)
(Continued)

(52) U.S. Cl.
CPC ............... *B64D 27/26* (2013.01); *F02C 7/20* (2013.01); *B64D 2027/262* (2013.01);
(Continued)

(58) Field of Classification Search
CPC ............. B64D 27/00; B64D 2027/266; B64D 2027/268; B64D 27/26; B64D 2027/264;
(Continued)

(56) References Cited

U.S. PATENT DOCUMENTS 3,323,817 A * 6/1967 Hollyday ................ F16B 2/065
                                                    403/367
3,570,125 A * 3/1971 Hahn ...................... B26B 3/00
                                                    211/70.7
(Continued)

FOREIGN PATENT DOCUMENTS

CA          733005     †   4/1966
CA          733005 A       4/1966
(Continued)

OTHER PUBLICATIONS

Extended EP search report for Application No. 15172439.0-1754 dated Nov. 11, 2015.
(Continued)

*Primary Examiner* — Jonathan Liu
*Assistant Examiner* — Taylor L Morris
(74) *Attorney, Agent, or Firm* — Lorenz & Kopf, LLP

(57) ABSTRACT

Exemplary embodiments are provided to reduce the high transient mount load in an aircraft engine mounting system under extreme loading condition. The exemplary embodiments reduce the impact of the snubbing phenomenon without adding to the weight or space claim of the engine mounting system.

9 Claims, 6 Drawing Sheets

(51) Int. Cl.
*F01D 25/16* (2006.01)
*F01D 25/28* (2006.01)

(52) U.S. Cl.
CPC .. *B64D 2027/266* (2013.01); *B64D 2027/268* (2013.01); *F01D 25/162* (2013.01); *F01D 25/28* (2013.01)

(58) Field of Classification Search
CPC ..... B64D 27/16; B64D 2027/262; F02C 7/20; F01D 25/28; F01D 25/162
USPC ......... 248/554–557, 221.12, 222.41; 244/54; 267/293
See application file for complete search history.

(56) References Cited

U.S. PATENT DOCUMENTS

| | | | | |
|---|---|---|---|---|
| 3,836,100 | A | † | 9/1974 | Von Hardenberg |
| 3,979,087 | A | * | 9/1976 | Boris ..................... B64D 27/18 244/54 |
| 4,044,973 | A | * | 8/1977 | Moorehead ............ B64D 27/26 244/54 |
| 4,725,019 | A | * | 2/1988 | White ..................... B64D 27/26 244/54 |
| 5,295,671 | A | † | 3/1994 | Nakagaki |
| 5,303,880 | A | * | 4/1994 | Cencula ................. B64D 27/26 244/54 |
| 5,927,665 | A | * | 7/1999 | Grabnic ................ E02F 3/3604 172/272 |
| 6,209,822 | B1 | * | 4/2001 | Le Blaye ............... B64D 27/26 244/54 |
| 6,328,293 | B1 | | 12/2001 | Olsen |
| 6,330,995 | B1 | † | 12/2001 | Manteiga |
| 6,394,432 | B1 | * | 5/2002 | Whiteford ................ G05G 5/03 267/136 |
| 6,581,874 | B2 | * | 6/2003 | Lemire .................. B64D 41/00 244/54 |
| 7,093,996 | B2 | * | 8/2006 | Wallace ................. B64D 27/26 403/78 |
| 8,561,942 | B2 | * | 10/2013 | Zheng .................... B64D 27/26 244/54 |
| 2003/0006540 | A1 | | 1/2003 | Houghton, Jr. et al. |
| 2013/0168913 | A1 | * | 7/2013 | Schluessel ........... B23Q 1/0072 269/309 |
| 2013/0180308 | A1 | * | 7/2013 | Breen .................. B21D 43/003 72/428 |
| 2013/0302157 | A1 | * | 11/2013 | Sandy ........................ F02C 7/20 415/213.1 |
| 2016/0169050 | A1 | * | 6/2016 | Scott ........................ F01D 25/28 415/213.1 |

FOREIGN PATENT DOCUMENTS

| | | | |
|---|---|---|---|
| EP | 0250659 B1 | | 3/1992 |
| JP | 2008-189078 | † | 8/2008 |
| JP | 2008189078 A | | 8/2008 |
| JP | 2011-144891 | † | 7/2011 |
| WO | 2010085360 A2 | | 7/2010 |
| WO | WO2010085360 | † | 7/2010 |

OTHER PUBLICATIONS

Lord Corporation; Engine Mounts; [Retrieved from Internet: http://www.lord.com/products-and-solutions/vibration-and-motion-control/vibration-isolator] Mar. 5, 2014.

\* cited by examiner
† cited by third party

METHOD AND APPARATUS FOR REDUCING HIGH TRANSIENT MOUNT LOAD IN AIRCRAFT ENGINE MOUNTING SYSTEMS

TECHNICAL FIELD

Embodiments of the subject matter described herein relate generally to aircraft engine mounting systems and, more particularly, to reducing high transient mount loads in aircraft engine mounting systems under extreme loading conditions.

BACKGROUND

A certain amount of vibration or shock occurs naturally as a dynamic load in an aircraft engine system. In a "hard mount" engine mount system, the vibration or shock is transmitted through the metal, which provides very little vibration isolation, to the aircraft frame. In order to foster a smoother flying experience, traditional aircraft design generally incorporates isolators in the engine mount system. Isolators provide vibration isolation with damping and it has lower mount stiffness than a 'hard mount' configuration. Owing to lower stiffness of isolators, the relative deflection at mount is higher than 'hard mounted' configuration for same transmitted load. To limit the relative deflection at isolator mount under high mount load conditions, snub clearance is provided. Snub clearance is a clearance in the isolator wall beyond which if relative motion occurs, a metal to metal contact will happen which will then reduce any further relative motion. In normal course of operation, relative motion at mount rarely exceeds snub clearance.

In extreme loading conditions, such as a fan blade out event (loss of a fan blade), crash landing, or extreme maneuver loading conditions, high relative displacement in the engine mount is developed. The relative motion at the mount under these loading conditions is often greater than the snub clearance, and a brief metal-to-metal contact occurs in the isolator. The mount load during metal-to-metal contact in the isolator is quite high in magnitude, and referred to as a "high transient mount load;" the metal-to-metal contact is referred to as "snubbing." When snubbing happens, there is momentary increase in transmitted mount load. Mount load due to the snubbing phenomenon is problematic because its magnitude is often significantly greater than the mount load without snubbing and may be higher than what is experienced by a hard mounted engine.

Accordingly, it would be desirable to reduce the high transient mount load in an aircraft engine mounting system. A desired improvement reduces the impact of the snubbing phenomenon without adding to the weight or space claim of the engine mounting system.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

An apparatus is provided for reducing the high transient mount load from an aircraft engine, the apparatus is of the type including a metallic housing with a sleeve for receiving a yoke pin. The apparatus includes a first wall having a first ovalized opening and a second wall having a second ovalized opening. The first ovalized opening and the second ovalized opening are coaxial and are oriented to receive the sleeve therethrough.

A method is provided for reducing the high transient mount load from an aircraft engine using an isolator mount of the type having a metallic housing including a first wall with a first through-hole and a second wall with a second through-hole. A first ovalized opening is created around the first through-hole in the first wall, and a second ovalized opening is created around the second through-hole in the second wall. The ovalized opening in the first wall and the ovalized opening in the second wall are oriented such that their major axes are aligned.

A system for reducing the high transient mount load from an engine is provided. The system includes an engine frame, and a first metallic housing secured to the engine frame. The metallic housing includes a first wall substantially parallel to a second wall, the first wall has a first through-hole and the second wall has a second through-hole. The first through-hole and the second through-hole have an ovalized opening. The system also includes a first sleeve for being received through the first and second through-hole, a first yoke bolt for being received through the first sleeve, and a yoke coupled to the first metallic housing, the first yoke bolt, and the first sleeve.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

FIG. 1A shows the starboard engine frame, enlarged with respect to aircraft 100 to make relevant components of the engine mounting system observable;

FIG. 1B shows the port engine frame, enlarged with respect to aircraft 100 to make relevant components of the engine mounting system observable;

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

For the sake of brevity, conventional techniques related to graphics and image processing, sensors, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment described herein is merely an example and serves as a guide for implementing the novel systems and method herein on any user interface in any industrial, commercial, or consumer avionics application. As such, the examples presented herein are intended as non-limiting.

Figure 1:
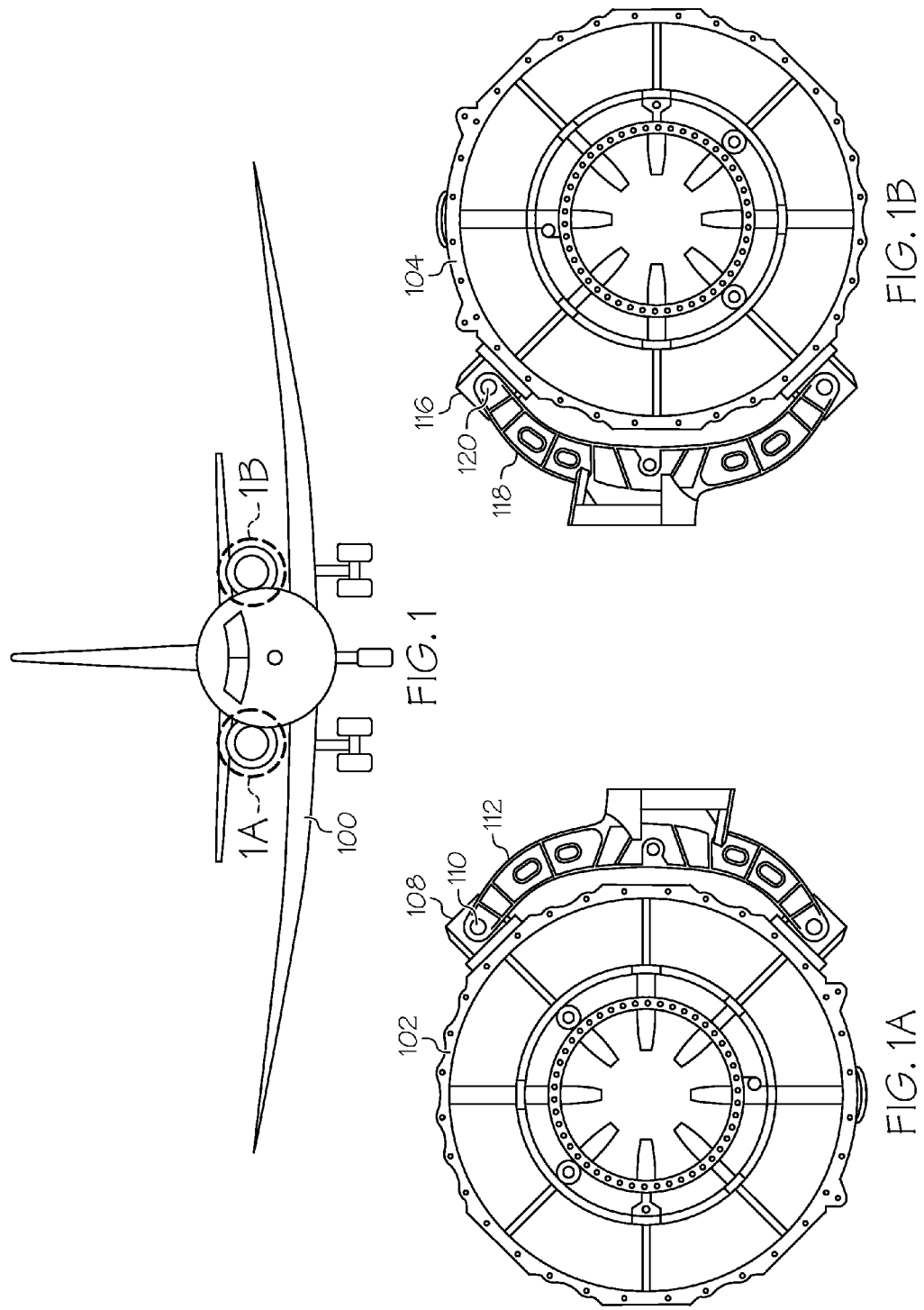
FIG. 1 is an illustration of an aircraft starboard and port engine mounting system suitable for use with an exemplary embodiment.

FIG. 1 is an illustration of an aircraft 100 and a starboard and port engine mounting system suitable for use with an exemplary embodiment. FIG. 1A shows the starboard engine frame 102 and FIG. 1B shows the port engine frame 104, enlarged with respect to aircraft 100 to make relevant components of the engine mounting system observable. A first isolator housing 108 is secured to starboard engine frame 102, and a yoke 112 is coupled to the first isolator housing 108 via a yoke bolt 110. A second isolator housing 114 is also shown coupling the yoke 112 to the starboard engine frame 102.

On the port side, a third isolator housing 116 is secured to port engine frame 104, and a yoke 118 is coupled to the third isolator housing 116 via a yoke bolt 120. Similarly, a fourth isolator housing 122 is shown coupling the yoke 118 to the port engine frame 104.

While the exemplary embodiment depicts one starboard and one port engine, it may be readily appreciated that there may be multiple engines on each side of the aircraft. Likewise, the exemplary embodiment depicts one yoke and two isolator housings for each aircraft engine frame; but, in practice, each aircraft engine frame may have multiple isolator housings and multiple yokes.

Figure 2:
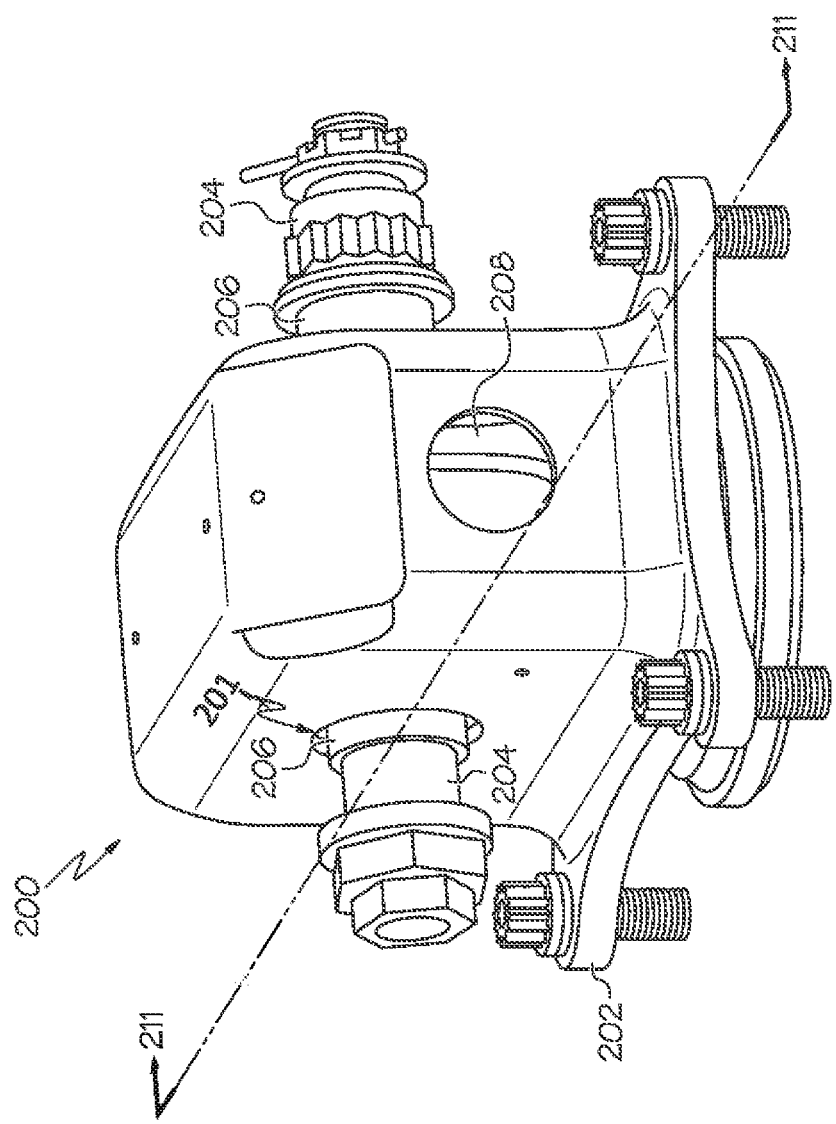
FIG. 2 is an illustration of a typical isolator housing.

FIG. 2 is an illustration of a traditional isolator housing 200. Isolator housing 200 has a flanged base area 202 used for securing the isolator housing 200 to an aircraft engine frame. Isolator housing 200 has a first wall and a second wall that is substantially parallel to the first wall; the isolator housing has a through-hole flanked by a first opening 201 on the first wall and a second opening on the second wall, and the first opening and second opening are coaxial. A sleeve 206 is shown extending through the first opening 201, and protrudes from the second opening on the second wall of the isolator housing 200. A yoke bolt 204 is also shown; the yoke bolt 204 extends through sleeve 206 and protrudes beyond the second wall of the isolator housing 200. As depicted in FIG. 1, yoke bolt 204 may be utilized to couple a yoke (such as FIG. 1 yoke 112) to an isolator housing.

Isolator housing 200 is filled with a material 208 capable of flexibly accommodating the normal dynamic load movement from an aircraft engine. In the exemplary embodiment, material 208 is elastomer packing, but the material may be any material suitable for flexibly accommodating the dynamic load movement of an aircraft engine. Arrow 211 indicates a medial line through the isolator housing, horizontally through opening 201 for reference to top down cross sections described in FIGS. 5-7.

Figure 3:
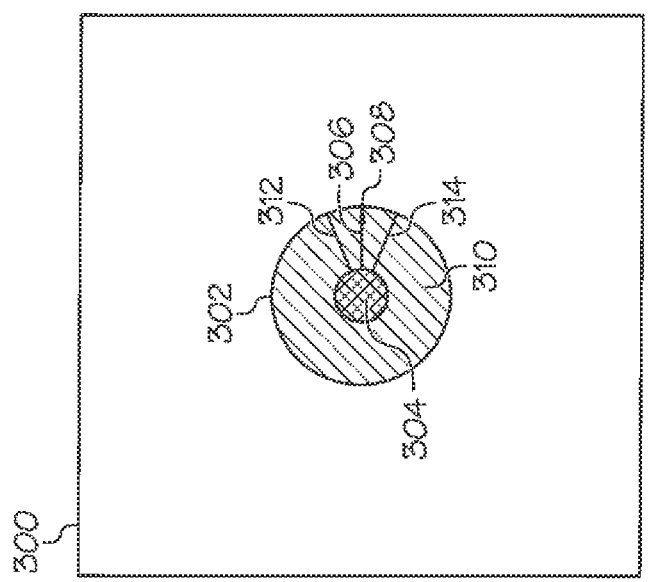
FIG. 3 is a two dimensional illustration of a traditional isolator housing with a yoke bolt in the opening.

FIG. 3 is a two dimensional illustration of a first wall of a traditional isolator housing 300 with a yoke bolt 304 in the opening 302. The sleeve (sleeve 206 in FIG. 2) for receiving yoke bolt 304 is omitted from the figure for simplification. Under extreme loading conditions, especially 'fan blade out' loading conditions, the flexible material 310 is compressed so much that yoke bolt 304 travels from substantially the center of the opening 302, approximately along a path (with respect to isolator housing, generally represented as path 306, to a contact point 308 on the circumference of the opening 302; at contact point 308 on the first wall of the isolator housing 300, the yoke bolt 304 makes metal-to-metal contact. It is to be understood that the yoke bolt 304 also makes contact with the opening on the second wall of the isolator housing. The radial distance represented by the generalized path 306 that the yoke bolt travels may be referred to as the snub clearance.

During 'fan blade out' simulation and in practice, the metal-to-metal contact repeatedly occurs in a generalized location on the circumference of the opening 302. The generalized location is indicated in FIG. 3 as a contact point 308 but generally occupies a range of substantially +/− fifteen degrees from the indicated contact point 308, shown by the radial lines 312 and 314. The path traveled by the yoke bolt 304 during snubbing is generally tangential to the aircraft engine frame and in a direction opposite to the direction of rotation of the fan blades (see FIG. 8). During initial transient reaction to 'fan blade out' event, the blade capture load on the engine containment case and the rub load between fan and the engine containment case causes the engine to torque about the engine centerline axis, which leads to the tangential motion of yoke bolt 304 with respect to isolator housing. The following exemplary embodiments improve snub clearance by addressing the area surrounding the metal-to-metal contact point 308.

Figure 4:
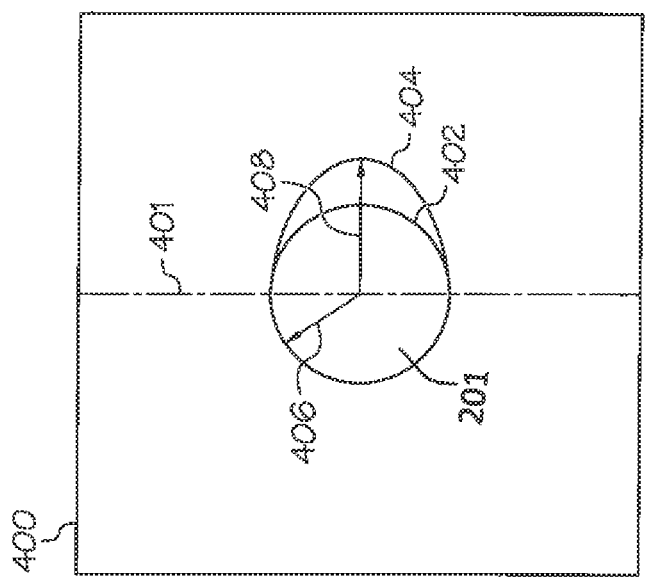
FIG. 4 is a two dimensional illustration of a first wall of an isolator housing with an ovalized opening according to an exemplary embodiment.

FIG. 4 is a two dimensional illustration of a first wall of an isolator housing with an ovalized opening according to an exemplary embodiment. By "ovalized" it is meant that the opening is continuous and has a cross section that is substantially semi-circular about a first half of a housing axis 401 and substantially oval-shaped on the other half of the housing axis 401.

As previously described, the first wall of isolator housing 400 has opening 402 suitable for receiving a yoke bolt and a sleeve therethrough. In FIG. 4, an ovalized shape 404 is overlaid on opening 402 and the through-hole associated with opening 402 is enlarged asymmetrically to become an oval shaped through-hole. The ovalized shape is achieved by combining a minor axis 406, or radius, of a predetermined value, R, on a first half of the housing axis 401 with a major axis 408 on a second half of housing axis 401. The minor axis 406 and major axis 408 are determined according to equations (1) and (2) below. The minor axis has a radius 'R' that may be based on the size of the engine mount, the size of the engine and the aircraft. The major axis is larger than the minor axis by a multiplier that may range from about 1.1 to about 1.4, but substantially 1.3 is preferable.

$$\text{Minor axis}=\text{Radius}=R \quad (1)$$

$$\text{Major axis}=1.3(R) \quad (2)$$

As is described in more detail hereinbelow, the first half may be considered the left half of the first wall of isolator housing 300 when viewing the isolator housing 300 with the flanged base (such as FIG. 2, object 202) at the bottom. The major axis 408 is to be aligned substantially tangential to the circular engine mount frame, and a direction opposite to the direction of rotation of the engine fan blades. The ovalization of opening 402 increases the snub clearance in the area of the contact point described in association with FIG. 3, thereby reducing the peak mount load. Localized increase in snub clearance at snub location increases the distance, through which engine can freely whirl and thus impacting the yoke with lower velocity and so the lower transmitted load. As such, the ovalization of opening 402 reduces the impact of the snubbing phenomenon without adding to the weight or space claim of the engine mounting system. The described ovalization does not adversely affect engine motion during normal operation.

Figure 5:
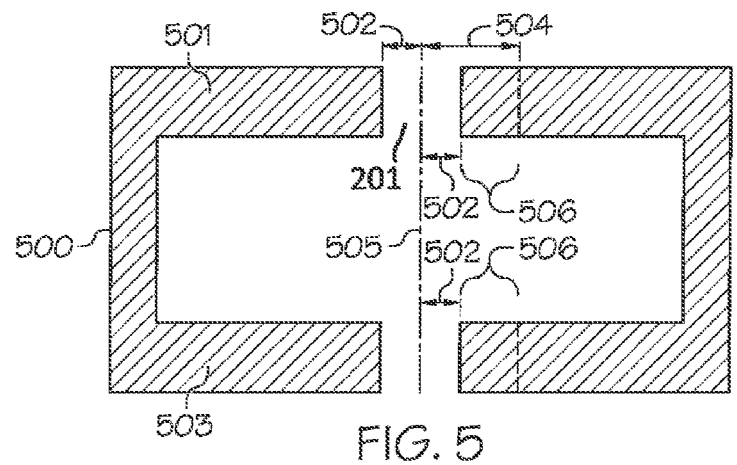
FIG. 5 is a top view of a cross section of a traditional isolator housing illustrating the creation of an ovalized opening according to an embodiment.

FIG. 5 is a top view of a cross section of a traditional isolator housing 500 illustrating the creation of an ovalized opening according to an embodiment. The simplified cross section is horizontal and medial, through the isolator housing across the through-hole, substantially along a line such as that indicated by arrow 211 in FIG. 2.

Within isolator housing 500, a through-hole is created with an opening defined by radius 502, as is shown on a first wall 503 and a second wall 501. The major and minor axes are with respect to the axis of the through-hole 505. Ovalization includes overlaying major axis 504 on the first wall 503 and second wall 501 such that the major axes on the first and second wall are aligned. The area indicated at bracket 506 is the proposed ovalization of the openings on each wall as described in association with FIG. 4 and equations (1) and (2).

Figure 6:
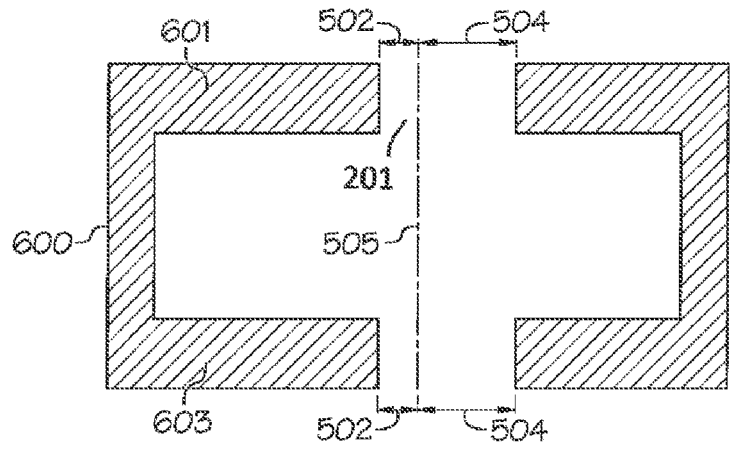
FIG. 6 is a top view of a cross section of an isolator housing illustrating a completed ovalized opening according to an embodiment.

FIG. 6 is a top view of a cross section of an isolator housing 600 illustrating a completed ovalized opening according to an embodiment. Within isolator housing 600, an opening on a first wall 603 is shown to have minor axis 502 on one half of the axis of the through-hole 505 and major axis 504 on the other half of axis of the through-hole 505. An opening on the second wall 601 is coaxial with the opening on the first wall, and has the same dimensions and orientation. As such, the opening on the second wall 601 has a minor axis 502 and a major axis 504, also according to equations (1) and (2).

Figure 7:
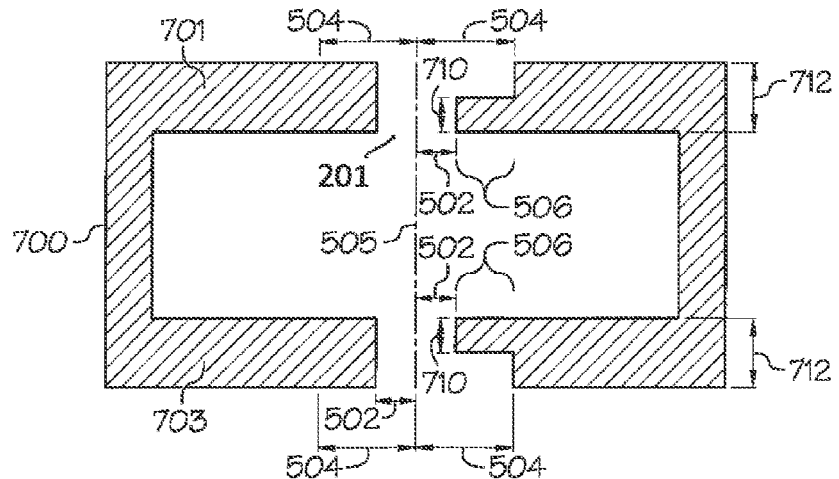
FIG. 7 is a top view of a cross section of an isolator housing with a thinned, ovalized through-hole according to another embodiment.

FIG. 7 is a top view of a cross section of an isolator housing 700 with a thinned ovalized opening according to another embodiment. Within isolator housing 700, an opening on a first wall 703 is shown to have a radius equal to minor axis 502 completely surrounding the axis of the through-hole 505. Major axis 504 is overlaid on the right half of axis of the through-hole 505. An opening on the second wall 701 is coaxial with the opening on the first wall, has the same dimensions, and has major axis 504 overlaid with the same orientation. The minor axis 502 and a major axis 504 are calculated according to equations (1) and (2).

However, in the exemplary embodiment of FIG. 7, instead of enlarging the through-hole associated with the openings on the first and second wall, the ovalized area defined by 506 is thinned from a starting predetermined wall thickness 712 to a predetermined thinness 710. Predetermined wall thickness 712 may be the thickness of a traditional isolator housing before ovalizing the opening. The first wall may have a first predetermined wall thickness and the second wall may have a second predetermined wall thickness. For each wall, the predetermined thinness is preferably within a range of about 0.2 to about 0.4 times the predetermined wall thickness.

Figure 8:
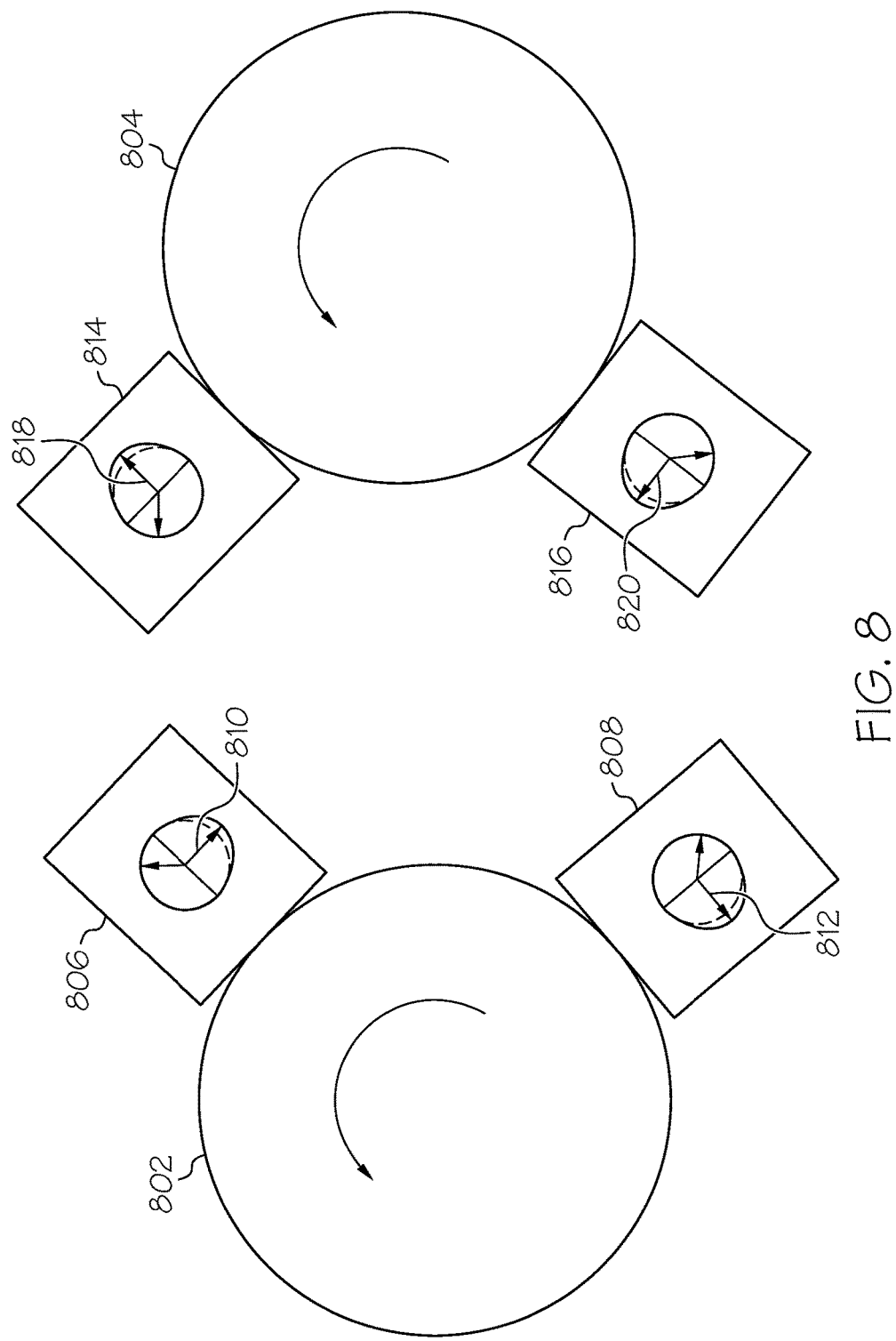
FIG. 8 is a simplified drawing of an aircraft starboard and port engine with isolator housings according to an exemplary embodiment.

In this embodiment, the major axis region is thinned in the localized region 506 rather than opened completely. By thinning the isolator housing material, the contact stiffness of the isolator housing is decreased and thus the reactive mount load is decreased. However, if the reacted mount load is high enough to tear through the thinned region, then metal-to-metal contact may eventually happen at the thicker portion of the isolator housing. However by the time this happens in the exemplary embodiment, the relative velocity between the yoke bolt and the isolator housing will have been reduced by the tearing of the thinned region, resulting in a reduced high transient mount load being transmitted to the aircraft frame. Therefore, the thinned region of the exemplary embodiment effectively increases the snub clearance in the area of the contact point described in association with FIG. 3. As such, the thinned region of the exemplary embodiment reduces the impact of the snubbing phenomenon without adding to the weight or space claim of the engine mounting system. The described thinning does not adversely affect engine motion during normal operation FIG. 8 is a simplified drawing of an aircraft starboard and port engine with isolator housings according to an exemplary embodiment. Starboard engine frame 802 and port engine frame 804 are shown with arrows illustrating the counter clockwise direction of the engine fan blades, and isolator housings having ovalized openings as described hereinabove. Starboard engine frame 802 is shown having isolator housing 806 and isolator housing 808 coupled thereto. Isolator housing 806 is depicted with major axis 810 tangentially aligned in an opposing direction from the fan direction. Similarly, isolator housing 808 is depicted with major axis 812 tangentially aligned in an opposing direction from the fan direction. The major axes of the isolator housings on starboard engine frame 802 are oriented with the same alignment.

On the port engine frame 804, isolator housing 814 and isolator housing 816 are shown coupled thereto. Isolator housing 814 is depicted with major axis 818 tangentially aligned in an opposing direction from the fan direction. Similarly, isolator housing 816 is depicted with major axis 820 tangentially aligned in an opposing direction from the fan direction. The major axes of the isolator housings on port engine frame 804 are oriented with the same alignment.

As previously described, each engine mount frame may have a plurality of isolator housings coupled thereto. It is readily appreciated that isolator housings utilizing a major axis according to the embodiment shown in FIG. 5 and FIG. 6 may be utilized on either the port or starboard engine mount frame, interchangeably, so long as the major axes are aligned as described.

Figure 9:
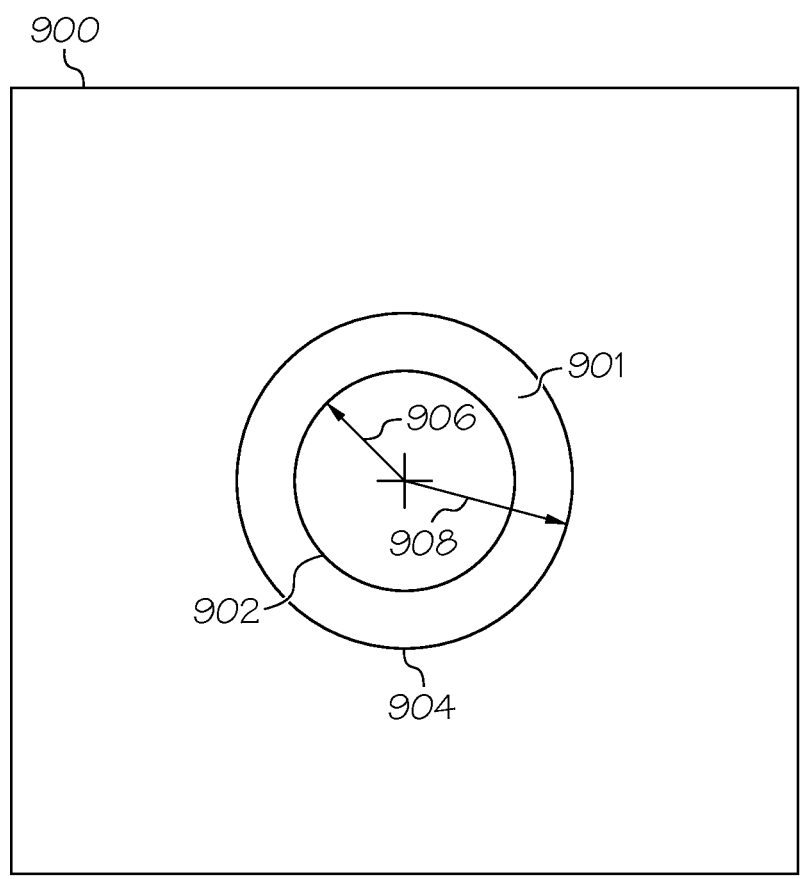
FIG. 9 is a two dimensional illustration of a first wall of an isolator housing according to another exemplary embodiment.

FIG. 9 is a two dimensional illustration of a first wall of an isolator housing 900 according to another exemplary embodiment. For manufacturing ease, the thinned, ovalized region described in FIG. 6 may be expanded to symmetrically encircle and alter the opening 902 as follows. A circumferential area 901 is created equal to the circular difference between major axis 908 and minor axis 906. In FIG. 9, this area is between circle 904 and opening 902. In this embodiment, the entire area 901 is thinned. Providing a thinned area around the entire opening may address various additional extreme loading conditions, such as some emergency landings and extreme maneuvers.

Accordingly, the exemplary embodiments introduced hereinabove reduce the high transient mount load in an aircraft engine mounting system. Exemplary embodiments reduce the impact of the snubbing phenomenon without adding to the weight or space claim of the engine mounting system.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An apparatus for reducing the high transient mount load from an aircraft engine, the apparatus of the type including a housing with a sleeve for receiving a yoke bolt, the apparatus comprising:

a first wall having a first ovalized opening; and
a second wall opposite the first wall, having a second ovalized opening;

wherein (i) the first ovalized opening and the second ovalized opening are for receiving the yoke bolt therethrough, (ii) the first ovalized opening and second ovalized opening each have a cross section that is continuous and substantially semi-circular according to a minor axis on a first half and substantially oval shaped having a major axis on a second half, (iii) the major axes of the first ovalized opening and the second ovalized opening are sized and oriented based on a distance that the yoke bolt travels responsive to the high transient mount load, and (iv) the major axes are oriented to align substantially tangentially with a circular engine mount frame, in a direction opposite to a direction of rotation of engine fan blades.

2. The apparatus of claim 1, wherein the major axis of the first ovalized opening and the major axis of the second ovalized opening are aligned and have a predetermined length.

3. The apparatus of claim 2, wherein the predetermined length is within a range of about 1.1 to about 1.4 times the minor axis.

4. The apparatus of claim 3, wherein the predetermined length is substantially equal to 1.3 times the minor axis.

5. The apparatus of claim 1 wherein the apparatus further comprises flexible packing material inside the housing.

6. The apparatus of claim 1 wherein the apparatus further comprises elastomer packing inside the housing.

7. The apparatus of claim 1, wherein the second half of the first ovalized opening comprises an ovalized area of a first predetermined thinness and the second half of the second ovalized opening comprises an ovalized area of a second predetermined thinness.

8. The apparatus of claim 7 wherein the first wall has a first wall thickness, and wherein the first predetermined thinness is within the range of 0.2 to 0.4 times the first wall thickness.

9. The apparatus of claim 7 wherein the second wall has a second wall thickness, and wherein the second predetermined thinness is within the range of 0.2 to 0.4 times the second wall thickness.

* * * * *